March 11, 1969     T. J. MUDON     3,431,653
PROTRACTOR FOR A FOLDING RULE
Filed April 11, 1968
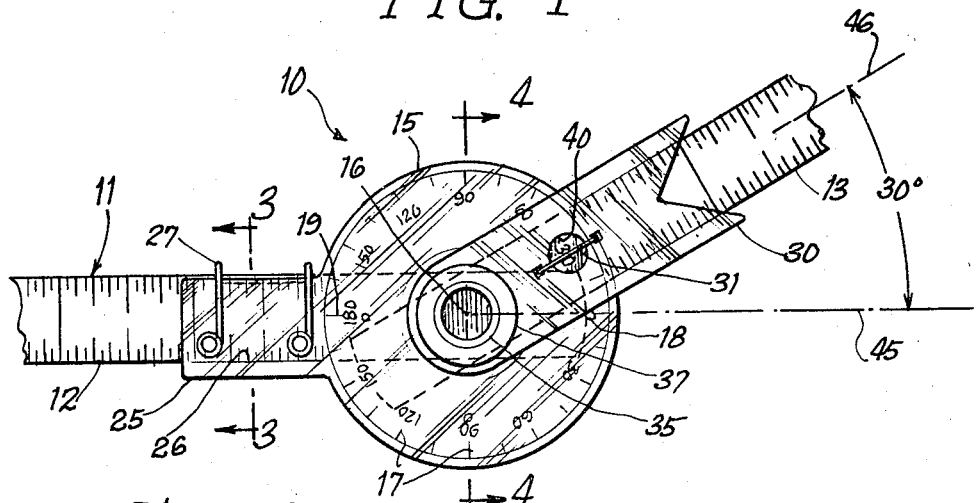
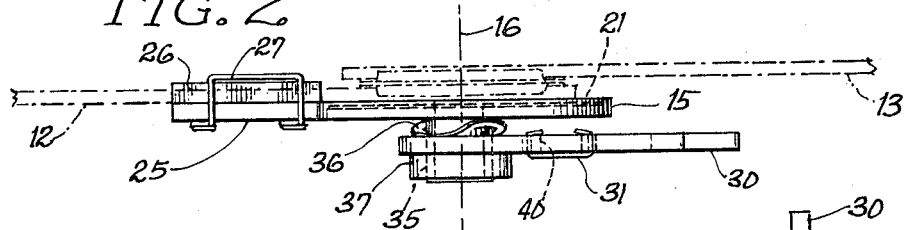
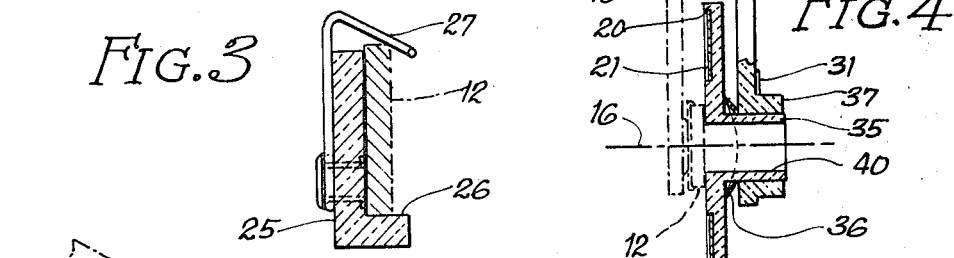
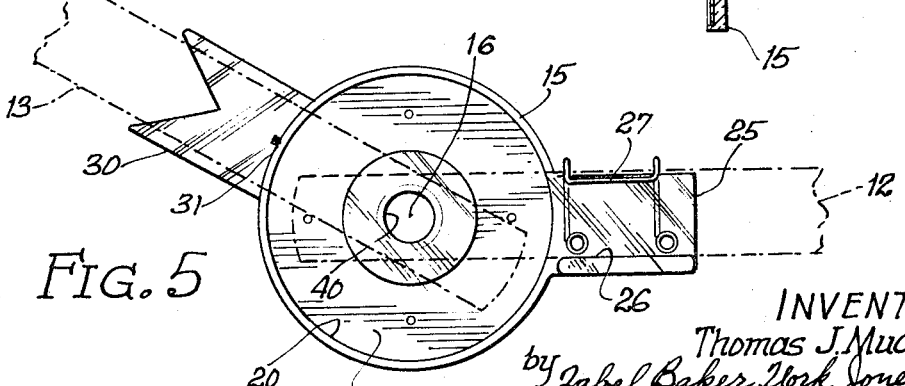

United States Patent Office 3,431,653
Patented Mar. 11, 1969

3,431,653
PROTRACTOR FOR A FOLDING RULE
Thomas J. Mudon, 2427 167th St.,
Hammond, Ind. 46323
Filed Apr. 11, 1968, Ser. No. 720,568
U.S. Cl. 33—105                                          7 Claims
Int. Cl. G01b 3/06

ABSTRACT OF THE DISCLOSURE

A protractor having two arms pivotally attached to each other with one arm detachably mountable on one segment of a folding rule, the one arm having a protractor scale about the pivotal joint. The other arm measures the angle between the extended longitudinal axis of the one segment and the longitudinal axis of an adjacent segment, thereby converting the folding rule into a combination protractor-rule.

Background of the invention

This invention relates to a protractor, and more particularly to a protractor detachably mountable on a folding rule for measuring the degree value of the angle between the extended longitudinal axis of one segment of the rule and the longitudinal axis of an adjacent segment. The protractor is designed especially for use in the construction trades.

As far as is known, there has been no prior proposal along the line of the present invention.

One protractor heretofore available for use in the construction trades comprises two segments suitably pivoted together. One segment has a calibrated portion, and the other segment has an index means in effective relation with the calibrated portion. This is a special tool offering little or no additional utility, and is not in particularly widespread use.

Virtually all workers in the construction trades possess and use the conventional six-foot folding rule of twelve pivotally related segments. When angles are encountered, as with pipes, conduits, mitered members, etc., the worker is likely to set two segments of his folding rule to the empirically determined angle, and thereafter carry the rule to a remote location for performing the bending, fabricating or sawing operation in accordance with the set angle between the rule segments. This procedure has shortcomings in that the angulation of the rule may be disturbed in transit, and there is no knowledge of the value of the angle for recording and later reference.

Summary of the invention

The protractor of the invention is designed particularly for use with the aforesaid conventional six-foot folding rule of the type commonly and extensively used by carpenters, electricians, pipe fitters, sheet metal workers and members of other construction trades. It is detachably mountable with fixed orientation on one segment of the rule in effective relation with the pivotal axis between that segment and an adjacent segment. The protractor has markings in degrees, and a rotatable pointer adapted to be aligned with the longitudinal axis of the adjacent segment. An index means on the pointer overlying the markings provides a reading on the markings of the angle between the extended longitudinal axis of the first segment and the longitudinal axis of the adjacent segment.

The protractor thus is usable either to obtain an angular reading in degrees between the aforesaid longitudinal axes of the two segments when the desired angular relation between the segments is established empirically, or to set an angle between the two segments in accordance with a predetermined angular value.

The protractor of the invention is readily applied to the aforesaid conventional folding rule, and thus converts any such rule into a rule and protractor combination. Further, workers both at the work site and at the bending, fabricating, or sawing stations each may use one of the protractors, and desired angles may be communicated back and forth orally, thereby avoiding the possibility of inadvertent change in angulation, and enabling one of the workers to make a note of the value of a particular angle.

Brief description of the drawing

FIG. 1 is a front elevational view of a protractor embodying the invention shown mounted on a fragmentary folding rule in effective relation with adjacent rule segments.

FIG. 2 is a top plan view of the protractor shown in FIG. 1, the rule being omitted for clarity.

FIG. 3 is a sectional view on line 3—3 of FIG. 1.

FIG. 4 is a sectional view on line 4—4 of FIG. 1.

FIG. 5 is a rear elevational view of the protractor.

Description of the preferred embodiment

Referring to the drawing, a protractor embodying the invention is generally designated 10 in FIG. 1. Protractor 10 is designed for detachable association with a folding rule 11 (FIG. 1) having fragmentarily shown adjacent sections 12 and 13. Rule 11, as mentioned, preferably is the widely used six-foot folding rule having twelve pivotally related segments.

Protector 10 includes a calibrated member 15 having a center designated 16. As illustrated, member 15 on each one-half portion of the face thereof has markings in degrees from 0 to 180, said markings referred to center 16 and collectively designated 17. Thus, the illustrated member 15 has two series of markings in degrees from 0 to 180, and it will be noted that the 0 degree marking 18 and the 180 degree marking 19 are common to both series. However, a single series of markings from 0 to 180 degrees may be used if desired.

In the form of the invention shown, calibrated member 15 is a circular disc of transparent plastic material having an annular recess 20 (FIG. 4) on the rear face, the center of the annulus of the recess being center 16 of member 15. An annular plate 21 is disposed within recess 20, and the aforesaid markings 17, 18 and 19 are inscribed on the front face of the plate, the markings being visible through the transparent plastic material.

Calibrated member 15 has means for detachably mounting same on one segment 12 of folding rule 11 in effective relation with adjacent segment 13. In the form of the invention shown, the attaching means comprises a radially extending portion 25 integral with member 15, portion 25 having a rearwardly extending longitudinal shoulder 26, best shown in FIGS. 2 and 3, adapted to bear against an edge of rule segment 12 (FIG. 1). A resilient member 27, mounted on portion 25, is adapted to bear against the opposite edge of rule segment 12 and detachably secure portion 25 of member 15 to segment 12.

It will be noted in FIG. 1 that the 0 and 180 degree markings 18 and 19 are aligned with the longitudinal axis of rule segment 12 when member 15 is mounted on the segment. Also, it will be noted that center 16 of member 15 is aligned with the pivotal axis between rule segments 12 and 13. This latter relationship is established by positioning member 15 so that center 16 is aligned with the "long line" on the rule associated with the half foot multiple at the pivot point. When so mounted, protractor 10 is in effective relation with the two rule segments for measuring the angle in question.

Protractor 10 also includes a pointer 30 mounted at one end on calibrated member 15 for rotation about center 16 of the member. Pointer 30 has an index means 31 overlying markings 17, 18 and 19 on member 15, as best shown in FIG. 1.

In the form of the invention shown, calibrated member 15 has an integral cylindrical portion 35 extending from the front face thereof concentric with center 16. Pointer 30 is journalled on cylindrical portion 35. An annular spring member 36 (FIG. 2) such as a wavy spring washer is disposed on cylindrical portion 35 between member 15 and pointer 30, and a pointer-retaining member 37 is secured to the free end of cylindrical portion 35 in position to stress spring member 36, thereby imparting a desired degree of friction in the relationship between pointer 30 and calibrated member 15.

Pointer 30, as shown, has an aperture 40 overlying markings 17, 18 and 19, and index means 31 is a wire extending across aperture 40 on the longitudinal axis of pointer 30.

Referring to the right in FIG. 1, the extended longitudinal axis of rule segment 12 is designated 45, and the longitudinal axis of adjacent rule segment 13 is designated 46. The angle between these two axes, designated 30 degrees at the right, is read from calibrated member 15 at the point where the calibrations are intersected by index means 31, the indicated angle being 30 degrees.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is—

1. A protractor for measuring the angle between the extended longitudinal axis of one segment of a folding rule and the longitudinal axis of the adjacent segment, comprising:
 a calibrated member having a center, and at least one series of markings in degrees from 0 to 180, said markings referred to said center;
 means for detachably mounting said member on one segment of a folding rule with the center of said member aligned with the pivotal axis of said one segment and an adjacent segment, the 0 and 180 degree markings aligned with the longitudinal axis of said one segment; and
 a pointer pivotally mounted at one end on said member for rotation on the center of said member, said pointer having index means overlying the markings on said member for indicating the angular position of said pointer and thus the angle between the extended longitudinal axis of said one segment and the longitudinal axis of said adjacent segment when said pointer is aligned with the longitudinal axis of said adjacent segment.

2. The combination of claim 1 wherein said calibrated member has two series of markings in degrees from 0 to 180, both series referred to said center, the 0 and 180 degree markings being common to both series of markings.

3. The combination of claim 1 wherein said calibrated member comprises a disc of transparent plastic material having an annular recess on the rear face, the center of the annulus of the recess constituting the center of the member, and an annular plate within said annular recess, said markings applied to the front face of said annular plate.

4. The combination of claim 1 wherein said means for detachably mounting said calibrated member on said one segment comprises a laterally extending portion integral with said member, said portion having a longitudinal shoulder adapted to bear against an edge of said segment and a resilient member adapted to bear against the opposite edge of said segment and secure said portion to said segment.

5. The combination of claim 1 wherein said calibrated member has an integral cylindrical portion on the front face thereof concentric with said center, said pointer journalled on said cylindrical portion.

6. The combination of claim 5 with the addition of an annular spring member on said cylindrical portion between said calibrated member and said pointer, and a pointer-retaining member secured to the free end of said cylindrical portion in position to stress said spring member.

7. The combination of claim 1 wherein said pointer has an aperture overlying said markings on said calibrated member, and wherein said index means is a wire extending across said aperture on the longitudinal axis of said pointer.

References Cited

UNITED STATES PATENTS

| | | | |
|---|---|---|---|
| 1,524,730 | 2/1925 | Cain | 33—105 X |
| 1,878,119 | 9/1932 | Dowd | 33—105 |
| 2,250,830 | 7/1941 | Gonzales | 33—115 |

HARRY N. HAROIAN, *Primary Examiner.*

U.S. Cl. X.R.

33—75